US011511938B2

United States Patent
Graham et al.

(10) Patent No.: US 11,511,938 B2
(45) Date of Patent: Nov. 29, 2022

(54) SYSTEMS AND METHODS FOR DOWNSPOUT RETENTION

(71) Applicant: DEERE & COMPANY, Moline, IL (US)

(72) Inventors: William Douglas Graham, East Moline, IL (US); Nicholas Geiger, Cissna Park, IL (US)

(73) Assignee: Deere & Company, Moline, IL (US)

( * ) Notice: Subject to any disclaimer, the term of this patent is extended or adjusted under 35 U.S.C. 154(b) by 516 days.

(21) Appl. No.: 16/691,867

(22) Filed: Nov. 22, 2019

(65) Prior Publication Data

US 2021/0153424 A1 May 27, 2021

(51) Int. Cl.
| | | |
|---|---|---|
| *B65G 11/02* | (2006.01) | |
| *A44B 18/00* | (2006.01) | |
| *B65G 11/16* | (2006.01) | |
| *B65G 11/10* | (2006.01) | |
| *A01C 7/20* | (2006.01) | |

(52) U.S. Cl.
CPC ........ *B65G 11/026* (2013.01); *A44B 18/0011* (2013.01); *B65G 11/10* (2013.01); *B65G 11/166* (2013.01); *A01C 7/201* (2013.01)

(58) Field of Classification Search
CPC ..... B65G 11/026; B65G 11/10; B65G 11/166; A44B 18/0011; A01C 7/201; A01C 15/003
See application file for complete search history.

(56) References Cited

U.S. PATENT DOCUMENTS

| | | | | |
|---|---|---|---|---|
| 5,020,651 | A * | 6/1991 | Lockett | E04F 17/12 |
| | | | | 193/2 A |
| 9,156,616 | B1 * | 10/2015 | Margino | B65G 11/186 |
| 2005/0178417 | A1 * | 8/2005 | Holub | E04H 15/32 |
| | | | | 52/13 |
| 2016/0031649 | A1 * | 2/2016 | Brandon | B65G 11/026 |
| | | | | 193/25 R |
| 2017/0274430 | A1 * | 9/2017 | Brick | B08B 9/0328 |
| 2018/0274240 | A1 * | 9/2018 | Kilbert | F16L 25/0009 |

* cited by examiner

*Primary Examiner* — Mark A Deuble

(57) ABSTRACT

Systems and method for retaining a downspout onto a spout are disclosed. The downspout may be retained on the spout using hook and loop fasteners. In some implementations, a portion of a spout may include a first portion of a hook and loop fastener and the downspout may include a second portion of the first hook and loop faster. The first and second portions of the hook and loop faster are complimentary such that the first and second portions of the hook and loop fastener combine to interlocking secure the downspout and the spout together.

17 Claims, 2 Drawing Sheets

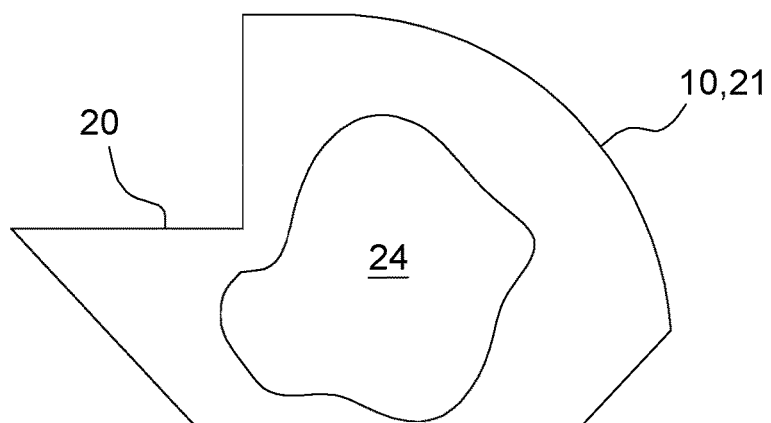
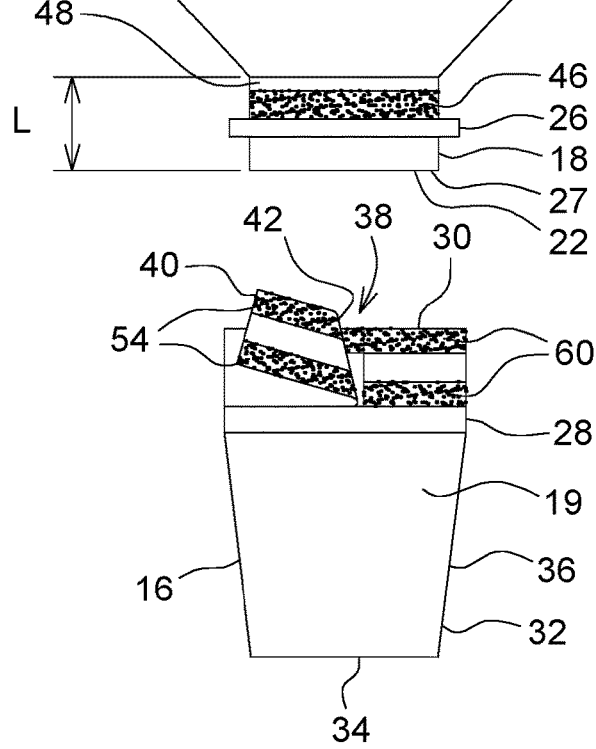
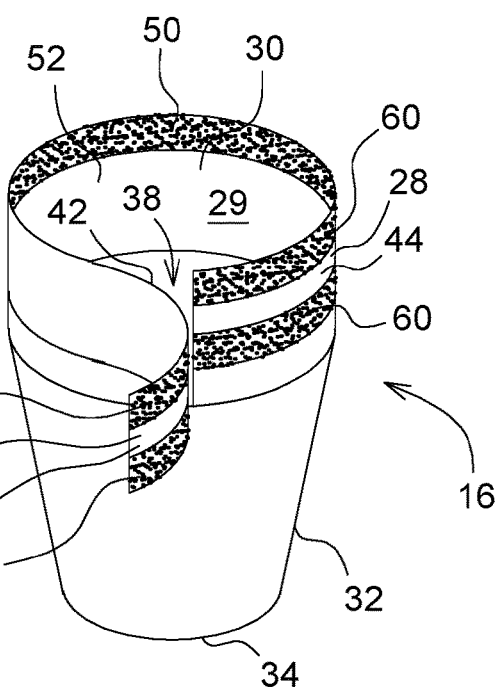
FIG. 2
FIG. 3

SYSTEMS AND METHODS FOR DOWNSPOUT RETENTION

FIELD OF THE DISCLOSURE

The present disclosure relates generally to retention of downspouts and, particularly, to retention of flexible downspouts on an agricultural seeder.

BACKGROUND OF THE DISCLOSURE

The present disclosure is directed to retention systems and methods for spout and downspout connections and, more particularly, to retention systems and methods for maintaining a connection between a spout and downspout in agricultural applications.

SUMMARY OF THE DISCLOSURE

A first aspect of the present disclosure is directed to a downspout for conveying materials. The downspout may include a first end portion configured to receive a portion of a spout; a second end portion; an inlet formed at the first end portion; an outlet formed at the second end portion; a passage extending from the first end to the second end and configured to permit passage of material therethrough; and a first portion of a first hook and loop fastener. The first portion of the first hook and loop fastener may be configured to couple to a second portion of the first hook and loop fastener, complementary to the first portion, located on a spout to form an interlocking connection. The inlet may be configured to receive the material, and the outlet may be configured to permit outflow of the material.

A second aspect of the present disclosure is directed to a spout and downspout assembly for a bulk material. The spout may include a body defining a cavity; an inlet formed at a first end portion of the body; an outlet formed at a second end portion of the body; and a first portion of a first hook and loop fastener, the first portion comprising one of a hook portion and a loop portion of the first hook and loop fastener. The downspout may include a first end portion defining an inlet; a second end portion defining an outlet; and a second portion of the first hook and loop fastener. The second portion may include the other of the hook portion and the loop portion of the first hook and loop fastener. The first hook and loop fastener may be configured to form an interlocking connection between the spout and the downspout.

A further aspect of the present disclosure is directed to a downspout of an agricultural conveyor system and coupled to an end of a spout. The downspout may include a first end portion defining an inlet configured to receive material; a second end portion defining an outlet configured to permit outflow of the received material; a flap formed on the first end portion and extending from a first side of the slit; a first portion of a first hook and loop fastener located on an interior surface of the flap; and a second portion of the first hook and loop fastener located on the exterior surface of the first end portion. The first portion of the first hook and loop fastener may include one of a hook portion or a loop portion of the first hook and loop fastener. The slit may be configured to alter a size of the inlet of the downspout. The flap may be configured to extend across the slit and be secured to an exterior surface of the first end portion. The first portion of the first hook and loop fastener may include one of a hook portion and a loop portion of the first hook and loop fastener. The second portion of the first hook and loop fastener may include the other of the hook portion and the loop portion of the first hook and loop fastener. The first portion of the first hook and loop fastener and the second portion of the first hook and loop fastener may be configured to engage each other to form an interlocking connection to secure the flap to the exterior surface of the first end portion.

The various aspects may include one or more of the following features. A slit may be formed in the first end portion. The slit may be operable to change an opening size of the inlet. The first end portion may include a flap formed on the first end portion and extending from a first side of the slit. The flap may be configured to extend across the slit and be secured to an exterior surface of the first end portion. The flap and slit may cooperate to reduce a size of the inlet when the flap is secured to the exterior surface of the first end portion. The flap may include one of a hook portion and a loop portion of a second hook and loop fastener. The first end portion may include the other of the hook portion and the loop portion of the second hook and loop fastener. The hook portion and the loop portion may combine to form an interlocking connection between the flap and the exterior surface of the first end portion. The first hook and loop fastener may be located on an inner surface of the first end portion.

The various aspects may also include one or more of the following features. The first portion of the first hook and loop fastener may be located on an exterior surface of the second end portion of the body of the spout. The second portion of the first hook and loop fastener may be located on an inner surface of the first end portion of the downspout. The second end portion of the downspout overlays and may be removably coupled to the second end portion of the spout. The first portion of the first hook and loop fastener may form an annular strip along an exterior surface of the spout. The second portion of the first hook and loop fastener may form an annular ring along an inner surface of the first end portion of the downspout. The downspout may further include a slit formed in the first end portion and a flap extending from a first side of the slit. The slit may be configured to alter a size of the inlet of the downspout, and the flap may be configured to extend across the slit and be secured to an exterior surface of the first end portion of the downspout. The flap and slip may cooperate to reduce a size of the inlet when the flap is secured to the exterior surface of the first end portion. The downspout may further include a first portion of a second hook and loop fastener located on an inner surface of the flap and a second portion of the second hook and loop fastener. The first portion of the second hook and loop fastener may include one of a hook portion and a loop portion of the second hook and loop fastener. The second portion of the second hook and loop fastener may include the other of the hook portion and the loop portion. The second hook and loop fastener may be configured to form an interlocking connection between the flap and the exterior surface of the first end portion of the downspout. The spout may also include a flange located along the first end portion of the body. The flange may be circumferentially located at an end of the first end portion of the body. The second portion of the first hook and loop fastener may reside between an inboard end of the second end portion of the body and an outboard end of the second end portion of the body when the first portion of the first hook and loop fastener and the second portion of the first hook and loop fastener are coupled. The downspout may be positioned on the second end portion of the spout such that the flange is positioned between the second portion of the first hook and loop fastener and the outlet of the downspout. The downspout may include a tapered portion.

A first portion of a second hook and loop fastener may be included on the downspout. The first portion of the second hook and loop fastener may include one of a hook portion or a loop portion of the second hook and loop fastener. The first portion of the second hook and loop fastener may be positioned on an interior surface of the first end portion and configured to engage a counterpart second portion located on a spout to form an interlocking connection between the downspout and the spout. The portions of the hook and loop fasteners may be in the form of strips. A strip of a hook and loop fastener may be located along an interior surface of the first end portion.

Other features and aspects will become apparent by consideration of the detailed description and accompanying drawings.

BRIEF DESCRIPTION OF THE DRAWINGS

The detailed description of the drawings refers to the accompanying figures in which:

FIG. 2 is an exploded view of an example spout and downspout combination that also includes a cutaway of the spout showing an interior cavity, according to some implementations of the present disclosure.

FIG. 3 is a perspective view of an example downspout, according to some implementations of the present disclosure.

DETAILED DESCRIPTION

Figure 1:
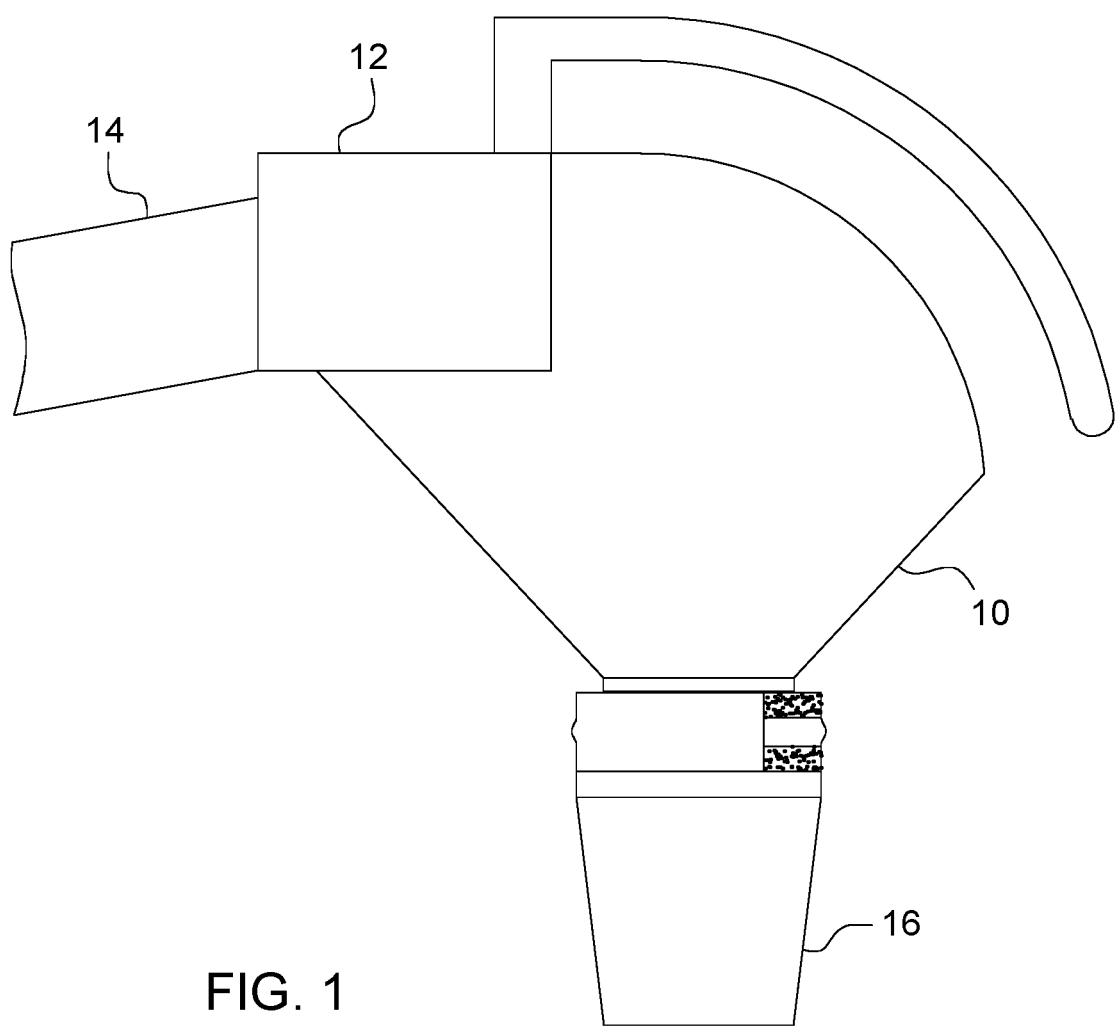
FIG. 1 is a side view of a portion of an example conveyor system having a spout and a downspout connected at an end of the conveyor system, according to some implementations of the present disclosure.

For the purposes of promoting an understanding of the principles of the present disclosure, reference will now be made to the implementations illustrated in the drawings, and specific language will be used to describe the same. It will nevertheless be understood that no limitation of the scope of the disclosure is intended. Any alterations and further modifications to the described devices, instruments, methods, and any further application of the principles of the present disclosure are fully contemplated as would normally occur to one skilled in the art to which the disclosure relates. In particular, it is fully contemplated that the features, components, and/or steps described with respect to one implementation may be combined with the features, components, and/or steps described with respect to other implementations of the present disclosure.

The present disclosure is directed to systems and methods for retaining a flexible downspout to a rigid spout that is used to convey granular material, such as seed. Particularly, the present disclosure is directed to a coupling between a flexible downspout and a rigid spout to retain the flexible downspout to the rigid spout. Various implementations are described in the context of agricultural applications, particularly, agricultural seeding applications. However, the scope of the present disclosure is not so limited, and the present disclosure is applicable to numerous other applications in the agricultural arts as well as applications outside of agriculture. Consequently, the implementations described in the context of agriculture and, particularly, seeding, are provided only as examples and are not intended to limit the scope of the disclosure.

Referring to FIGS. 1 and 2, a spout 10 is coupled to an end 12 of a conveyor 14. The conveyor 14 may be, for example, a conveyor included on a seeder cart used to carry bulk seed for use by an agricultural seeder. A spout 10 is coupled to an end 12 of the conveyor 14, and a downspout 16 is coupled to an end portion 18 of the spout 10. In some implementations, the spout 10 may be formed from a rigid polymeric material. In other implementations, the spout 10 may be formed from metal, such as steel or aluminum. The spout 10 may be formed from other materials in other implementations. The downspout 16 is formed of a flexible material. For example, the downspout 16 may be formed from canvas, rubberized canvas, rubber, or vinyl. Further, the downspout 16 includes a smooth exterior surface 19, which eliminates or reduces the risk of snagging the downspout 16. As a result, the risk of damaging the downspout 16 or removing the downspout 16 from the spout 10 as a result of snagging is reduced or eliminated.

FIG. 2 shows an exploded view of the spout 10 and the downspout 16 with a cutaway in the spout 10 showing an interior of the spout 10. Referring to FIG. 2, the spout 10 includes a body 21 having an inlet 20 and an outlet 22. A cavity 24 is formed in the body 21 of the spout 10 between the inlet 20 and the outlet 22, as shown in the cutaway. The inlet 20 receives material, such as bulk seed, fertilizer, or other materials, from a conveyor, for example, such as conveyor 14 shown in FIG. 1. The received material is output from the spout 10 through the outlet 22. The end portion 18 of the spout 10 extends from the body 21 and defines the outlet 22.

The end portion 18 of the spout 10 includes a bead or flange 26, and an end portion 28 of the downspout 16 is received over the flange 26 and attaches to the end portion 18 of the spout 10. Although the flange 26 is illustrated as being located centrally along a length L of the first end portion 18, the flange 26 may be positioned at other locations. For example, the flange 26 may be circumferentially located at an end 27 of the first end portion 18. The downspout 16 has a tubular shape defining an interior passage 29, shown in FIG. 3. The end portion 28 of the downspout 16 defines an inlet 30, and an end portion 32, opposite the end portion 28, defines an outlet 34. The inlet 30 is configured to receive material, and the outlet 34 is configured to permit outflow of material from the downspout 16. In some implementations, the downspout 16 includes a tapered portion 36 extending from the end portion 28. In other implementations, the tapered portion 36 may be omitted, and the downspout 16 may have a uniform, non-tapered cross-sectional shape along an entirety of the downspout 16.

The downspout 16 also includes a slit 38 that extends at least partially though the end portion 28 in a longitudinal direction. The slit 38 allows for alteration of a size of the inlet 30, such as to increase or decrease a size of the inlet 30. For example, the slit 38 may provide for enlargement of the inlet 30 to permit the end portion 28 to pass over the flange 26 formed on the end portion 18 of the spout 10. The downspout 16 also includes a flap 40 extending from a side 42 of the slit 38. With the downspout 16 fitted onto the end portion 18 of the spout 10, the flap 40 is secured to an exterior surface 44 of the downspout 16. The flap 40 assists in securing the downspout 16 to the end portion 18 of the spout. In some implementations, the flange 26 may be omitted, and retention of the downspout 16 to the spout 10 may be the result of the hook and loop fasteners, as described in more detail below. Example hook and loop fasteners include Velcro® produced by Velcro BVBA located at Industrielaan 16, 9800 Deinze, Belgium. Other types of hook and loop fasteners are also contemplated. A hook and loop fastener includes a hook portion that includes one or more hooks and a loop portion that includes one or more loops adapted to engage the one or hooks to form an interlocking connection.

To secure the downspout 16 to the spout 10 such that the end portion 28 of the downspout 16 grips the end portion 18 of the spout 10, hook and loop fasteners are used. In the illustrated implementation, as shown in FIGS. 2 and 3, a first strip 46 of one of a first portion of a hook and loop fastener is secured to an exterior surface 48 of the end portion 18. The first portion of the hook and loop fastener may be a hook portion that includes one or more hooks or a loop portion that includes one or more loops. In some implementations, the first strip 46 forms an annular ring around the first end portion 18. In some implementations, the strip 46 may be secured to the exterior surface 48 with an adhesive, a fastener, a combination of an adhesive and a fastener, or another type of coupling. For example, in some implementations, the strip 46 may be attached to the exterior surface 48 with an adhesive and a series of rivets. A second strip 50 of the other of the hook portion and the loop portion of the hook and loop fastener is secured to an inner surface 52 of the downspout 16. In some implementations, the second strip 50 forms an annular ring on the inner surface 52 of the first end portion 28 of the downspout 16. For example, the strip 50 may be secured to the end portion 18 of the spout 10 with an adhesive, a fastener, a combination of an adhesive and a fastener, or another type of coupling. For example, the strip 50 may be secured with an adhesive and a series of rivets. The first strip 46 and the second strip 50 combine to form an interlocking hook and loop fastener to secure to the end portion 28 of the downspout 16 to the end portion 18 of the spout 10. Where the spout 10 includes a flange 26, because the first strip 46 is located between the body 21 and the flange 26 of the spout 10, the first and second strips 46 and 50 cooperate to form an interlocking fit between the spout 10 and the downspout 16 at a location between body 21 and the flange 26.

Although FIG. 2 shows a continuous strip 46, in other implementations, a discontinuous strip may be used. For example, in some implementations, two or more separate pieces of hook and loop fasteners may be used. For example, in some implementations, a plurality of hook and loop fastener segments may be distributed circumferentially along the exterior surface 48 of the end portion 18. In some implementations, the plurality of segments may be uniformly distributed along the exterior surface 48. In some implementations, some of the segments of the hook and loop fasteners may be hook portions while other segments may be loop portions. These different segments may mate with counterpart segments included on the inner surface 52 of the downspout 16 to form an interlocking connection. Further, in some implementations, the segments of the hook and loop fasteners may alternate such that a hook portion is flanked by hoop portions. Again, the downspout 16 may include a complimentary arrangement of hook and loop fastener segments that cooperate to form an interlocking connection between the spout 10 and the downspout 16. Still further, although a single strip 46 and 50 is included on the spout 10 and downspout 16, respectively, in other implementations, a plurality of strips may be included. For example, in some implementations, a strip on both sides of the flange 26, wherein the flange 26 is offset from the end 27, may be secured to the exterior surface 48 of the end portion 18 of the spout 10. Complementary strips may also be secured to the inner surface 52 of the downspout 16 to correspond to the strips included on the exterior surface 48 of the end portion 18 of the spout 10. Still further, in other implementations, any number of arrangements of hook and loop fastener strips or of segments may be used to secure the downspout 16 to the spout 10.

Further, in the illustrated example, as shown in FIGS. 2 and 3, the flap 40 of the downspout 16 also includes two strips of hook and loop fasteners. As shown, two strips 54 of hook and loop fasteners are positioned on an interior surface 58 of the flap 40 and two strips 60, corresponding to the strips 54, are formed on an exterior surface 44 of the end portion 28 of the downspout 16. The strips 54 cooperate with the counterpart strips 60 to secure the downspout 16 to the spout 10. In the illustrated example, the strips 54 and 60 flank the flange 26 on opposing sides thereof to reduce an opening size of the inlet 30 and secure the downspout 16 to the spout 10. Although two strips 54 and 60 are shown, any number of strips may be used. Further, a single continuous segment may be used, as opposed to individual strips. Also, as explained earlier, the flange 26 may be omitted.

Further, in some implementations, each the strips 54 may be contain one of a hook portion and a loop portion, while the strips 60 contain the other of the hook portion and the loop portion so that the strips 54 and 60 combine to form hook and loop fasteners. In other implementations, one of the strips 54 may include a hook portion with the other of the strips 54 including a loop portion. In such an implementation, the strips 60 include counterparts to the hook portion and loop portion so that the corresponding strips 54 and 60 join to form a hook and loop fastener. In still other implementations, each of the flap 40 and exterior surface 44 may include a single segment containing corresponding hook and loop fastener material. In still other implementations, each of the flap 40 and exterior surface 44 may contain a plurality of segments of corresponding hook and loop fastener material to form a securing connection between the flap 40 and the exterior surface 44. In some implementations, the strip 50 and the strip 54 along the opening 30 may be a single continuous strip.

Similar to the strips 46 and 50 described earlier, the strips 54 and 60 may be secured to the downspout 16 with an adhesive, a fastener, a combination of an adhesive and a fastener, or another type of coupling. For example, in some implementations, one or all of the strips 46 and 50 may be secured to the downspout 16 using an adhesive and one or more rivets. Still further, any of the hook and loop fasteners described herein may be attached using the example techniques described herein.

In some implementation, where the spout 10 includes the flange 26, the hook and loop fastener formed by the strips 46 and 50 may be omitted. In such implementations, the hook and loop fasteners formed by the strips 54 and 60 may be used to secure the downspout 16 to the spout. Particularly, the end portion 28 of the downspout 16, with the flap 40 in an unsecured condition such that the slit 38 is operable to permit alteration of the size of the inlet 30, is slipped over the end portion 28 of the spout 10, including the flange 26. With the end portion 28 overlapping the end portion 18, the flap is cinched such that the opening size of the inlet 30 is reduced to conform to a size of the end portion 18 of the spout 10 inward of and adjacent to the flange 26 and secured to the exterior surface 44 of the downspout 16 with the hook and loop fasteners formed by the strips 54 and 60. With such an attachment between the spout 10 and downspout 16, a closing force provided by the hook and loop fasteners formed by the strips 54 and 60 and interference between the end portion 28 and flange 26 of the spout 10 provide for a secure, interlocking connection.

The downspout 16 and the manners of attaching the downspout 16 to the spout 10, described above, provide benefits over existing downspouts and couplings. Presently, many downspouts are corrugated or spiral corrugated tubes that are connected to a spout using a hose clamp or a spiral duct hose clamp or other type of clamp. However, over time, the material of the spout experiences dimensional changes in response to stress applied thereto by the hose clamp and temperature changes. As a result, the downspout becomes loosely connected to the spout and, therefore, easily removable, such as in response to normal operation of these components. Further, the corrugations formed in the downspout produce snagging risks, that place large, irregular loading on the downspout. As a result, this large, irregular loading results in tearing or displacing of the downspout or removal of the downspout from the spout.

The present disclosure provides for mounting of the downspout in a way that maintains a robust connection of the downspout and the spout irrespective of any dimensional changes to the spout because the hook and loop fasteners retain the downspout to the spout notwithstanding dimensional changes to the spout. Further, the downspout of the present disclosure omits corrugations, eliminating a snagging risk that corrugations present. Consequently, the downspout and associated mounting regime provides for a robust connection between the downspout and spout while eliminating or reducing the risk of separation of the downspout from the spout.

Without in any way limiting the scope, interpretation, or application of the claims appearing below, a technical effect of one or more of the example embodiments disclosed herein is provide a robust connection between a spout and a downspout that maintains connection notwithstanding any dimensional changes of a portion of the spout that connects with the downspout. Further, the downspout includes a surface lacking surface features, such as corrugated ribs, that are prone to snagging. In some implementations, the downspout includes a smooth surface.

While the above describes example embodiments of the present disclosure, these descriptions should not be viewed in a limiting sense. Rather, other variations and modifications may be made without departing from the scope and spirit of the present disclosure as defined in the appended claims.

What is claimed is:

1. A downspout for conveying materials, the downspout comprising:
    a first end portion configured to receive a portion of a spout;
    a second end portion;
    an inlet formed at the first end portion, the inlet configured to receive material;
    an outlet formed at the second end portion, the outlet configured to permit outflow of material;
    a passage extending from the first end to the second end and configured to permit passage of material therethrough;
    a first portion of a first hook and loop fastener, the first portion of the first hook and loop fastener configured to couple to a second portion of the first hook and loop fastener, complementary to the first portion, located on a spout to form an interlocking connection; and
    a slit formed in the first end portion, the slit operable to change an opening size of the inlet,
    wherein the first end portion comprises a flap formed on the first end portion and extending from a first side of the slit.

2. The downspout of claim 1, wherein the flap is configured to extend across the slit and be secured to an exterior surface of the first end portion.

3. The downspout of claim 2, wherein the flap and slip cooperate to reduce a size of the inlet when the flap is secured to the exterior surface of the first end portion.

4. The downspout of claim 1, wherein the flap comprises one of a hook portion and a loop portion of a second hook and loop fastener, wherein the first end portion comprises the other of the hook portion and the loop portion of the second hook and loop fastener, and wherein the hook portion and the loop portion combine to form an interlocking connection between the flap and the exterior surface of the first end portion.

5. The downspout of claim 1, wherein the first hook and loop fastener is located on an inner surface of the first end portion.

6. A spout and downspout assembly for a bulk material, the assembly comprising:
    a spout comprising:
        a body defining a cavity;
        an inlet formed at a first end portion of the body;
        an outlet formed at a second end portion of the body; and
        a first portion of a first hook and loop fastener, the first portion comprising one of a hook portion and a loop portion of the first hook and loop fastener; and
    a downspout comprising:
        a first end portion defining an inlet;
        a second end portion defining an outlet; and
        a second portion of the first hook and loop fastener, the second portion of the first hook and loop fastener comprising the other of the hook portion and the loop portion of the first hook and loop fastener, the first hook and loop fastener configured to form an interlocking connection between the spout and the downspout,
    wherein the downspout further comprises:
        a slit formed in the first end portion, the slit configured to alter a size of the inlet of the downspout; and
        a flap extending from a first side of the slit, the flap configured to extend across the slit and be secured to an exterior surface of the first end portion of the downspout.

7. The assembly of claim 6, wherein the first portion of the first hook and loop fastener is located on an exterior surface of the second end portion of the body of the spout and wherein the second portion of the first hook and loop fastener is located on an inner surface of the first end portion of the downspout.

8. The assembly of claim 6, wherein the second end portion of the downspout overlays and is removably coupled to the second end portion of the spout.

9. The assembly of claim 6, wherein the first portion of the first hook and loop fastener forms an annular strip along an exterior surface of the spout, wherein the second portion of the first hook and loop fastener forms an annular ring along an inner surface of the first end portion of the downspout.

10. The assembly of claim 6, wherein the flap and slip cooperate to reduce a size of the inlet when the flap is secured to the exterior surface of the first end portion.

11. The assembly of claim 6, wherein the downspout further comprises:
    a first portion of a second hook and loop fastener located on an inner surface of the flap, first portion comprising one of a hook portion and a loop portion of the first hook and loop fastener; and a second portion of the second hook and loop fastener, the second portion comprising the other of the second hook portion and the loop portion, wherein the second hook and loop fastener configured to form an interlocking connection between the flap and the exterior surface of the first end portion of the downspout.

12. The assembly of claim 6, wherein the spout further comprises a flange located along the first end portion of the body.

13. The assembly of claim 12, wherein the flange is circumferentially located at an end of the first end portion of the body and wherein the second portion of the first hook and loop fastener resides between an inboard end of the second end portion of the body and an outboard end of the second end portion of the body when the first portion of the first hook and loop fastener and the second portion of the first hook and loop fastener are coupled.

14. The assembly of claim 12, wherein the downspout is positioned on the second end portion of the spout such that the flange is positioned between the second portion of the first hook and loop fastener and the outlet of the downspout.

15. A downspout of an agricultural conveyor system that is couplable to an end of a spout, the downspout comprising:
a first end portion defining an inlet configured to receive material;
a second end portion defining an outlet configured to permit outflow of the received material;
a slit formed in the first end portion, the slit configured to alter a size of the inlet of the downspout;
a flap formed on the first end portion and extending from a first side of the slit, the flap configured to extend across the slit and be secured to an exterior surface of the first end portion;
a first portion of a first hook and loop fastener located on an interior surface of the flap, the first portion of the first hook and loop fastener comprising one of a hook portion and a loop portion of the first hook and loop fastener; and
a second portion of the first hook and loop fastener located on the exterior surface of the first end portion, the second portion comprising the other of the hook portion and the loop portion of the first hook and loop fastener, the first portion of the first hook and loop fastener and the second portion of the first hook and loop fastener configured to engage each other to form an interlocking connection to secure the flap to the exterior surface of the first end portion.

16. The downspout of claim 15, further comprising a first portion of a second hook and loop fastener, the first portion of the second hook and loop fastener comprising one of a hook portion or a loop portion of the second hook and loop fastener, the first portion of the second hook and loop fastener positioned on an interior surface of the first end portion and configured to engage a counterpart second portion located on a spout to form an interlocking connection between the downspout and the spout.

17. The downspout of claim 16, wherein the first portion of the second hook and loop fastener forms a strip located along an interior surface of the first end portion.

* * * * *